(12) United States Patent
Facchinello et al.

(10) Patent No.: US 10,464,401 B2
(45) Date of Patent: Nov. 5, 2019

(54) TONNEAU COVER WITH LIVING HINGE

(71) Applicant: Tectum Holdings Inc., Ann Arbor, MI (US)

(72) Inventors: Jerome Facchinello, Grand Blanc, MI (US); Jeffrey S. Quinn, Brentwood, TN (US); Kelly J. Kneifl, Yankton, SD (US)

(73) Assignee: Tectum Holdings Inc., Ann Arbor, MI (US)

(*) Notice: Subject to any disclaimer, the term of this patent is extended or adjusted under 35 U.S.C. 154(b) by 61 days.

(21) Appl. No.: 15/717,036

(22) Filed: Sep. 27, 2017

(65) Prior Publication Data
US 2019/0092149 A1 Mar. 28, 2019

(51) Int. Cl.
B60J 7/14 (2006.01)
B60J 7/08 (2006.01)

(52) U.S. Cl.
CPC ............... B60J 7/141 (2013.01); B60J 7/085 (2013.01)

(58) Field of Classification Search
CPC ..................... B60J 7/141; B60J 7/085
See application file for complete search history.

(56) References Cited

U.S. PATENT DOCUMENTS

| | | | |
|---|---|---|---|
| 9,895,963 B1* | 2/2018 | Spencer | B60J 7/141 |
| 2013/0093206 A1* | 4/2013 | Rusher | B60P 7/02 |
| | | | 296/100.14 |
| 2016/0288720 A1 | 10/2016 | Huebner et al. | |

* cited by examiner

Primary Examiner — D Glenn Dayoan
Assistant Examiner — Melissa A Black
(74) Attorney, Agent, or Firm — The Dobrusin Law Firm, P.C.

(57) ABSTRACT

A tonneau cover that includes a single panel and at least one living hinge. The single panel comprises a plurality of panel sections defined in the single panel. The panel sections are adapted to move relative to each other about the living hinge. The tonneau cover is adapted to be placed over a top end of a cargo box of a pickup truck.

20 Claims, 3 Drawing Sheets

TONNEAU COVER WITH LIVING HINGE

FIELD

These teachings relate to a tonneau cover, and more particularly to a tonneau cover with a living hinge.

BACKGROUND

A tonneau cover is a cover that is adapted to cover a cargo box of a vehicle, such as a pickup truck.

Some tonneau covers are made of two or more enclosure panels. Adjacent enclosure panels are typically connected together via a connector or rail. The connector or rail is also adapted to provide for the adjacent panels to be folded, pivoted, or otherwise moved relative to each other to provide access to the inside of the cargo box.

Due to manufacturing and/or assembly variations, some edges of some enclosure panels may have uneven cuts or surfaces, which may undesirably provide a passageway for water to travel around the edges of an enclosure panel and connector and enter the cargo box.

Also, during manufacturing and/or assembly of the tonneau cover, varying amounts of adhesive and/or sealant may be applied to the panels and/or connector to join the panels and connector together, which may undesirably result in areas having little or no adhesive and/or sealant, which may also undesirably provide a passageway for water to enter the cargo box.

Moreover, applying the adhesive and/or sealant during manufacturing and/or assembly may be labor intensive, time consuming, and cumbersome. Adhesive and/or sealant may also be wasted due to the manual application of the adhesive and/or sealant. Lastly, additional footprint in the manufacturing and/or assembly facility must be dedicated to storing the adhesive, sealant, connectors, etc.

Accordingly, opportunities may exist for improving the current state of the art.

For example, for some applications, it may be desirable to have a tonneau cover that can folded, pivoted, rotated, or otherwise moved to provide access to the inside of the cargo box, but is free of connectors or rails joining together adjacent panels. By having such a tonneau cover, passageways or gaps between the panel(s) and the connector(s) would be eliminated thus eliminating passages for water to enter the cargo box.

Moreover, manufacturing and assembling of such a tonneau cover may be less complex and less expensive; manufacturing and assembly time may be reduced; and storage space required at the manufacturing and/or assembly facility for storing connectors or rails, adhesive, and/or sealant may be reduced or eliminated.

Lastly, by having a tonneau cover that is free of connectors or rails, aesthetics and an overall appearance of the tonneau cover may be improved because the tonneau cover would have an overall sleek, smooth, and constant exterior surface appearance without any visible connectors, rails, joints, and/or discrete panel sections.

SUMMARY

These teachings provide a tonneau cover that can folded, pivoted, rotated or otherwise moved to provide access to the inside of the cargo box, but is free of connectors or rails joining together adjacent panel sections. Advantageously, by having such a tonneau cover, passageways or gaps between the panel(s) and the connector(s) are eliminated, thus eliminating passages for water to enter the cargo box. Also, the tonneau cover according to the teachings herein advantageously eliminates need for providing connectors or rails between the panel sections, thus advantageously reducing component inventory in the manufacturing facility; reduces assembly and manufacturing time; reduces cost of the tonneau assembly; and reduces material handling.

A tonneau cover comprising a single panel and a plurality of living hinges. The single panel comprises a plurality of panel sections. The plurality of living hinges are defined in the single panel. The panel sections are adapted to move relative to each other about the living hinges. The tonneau cover is adapted to be placed over a top end of a cargo box of a pickup truck.

A tonneau cover comprising a single panel, a living hinge, and a frame. The living hinge is adapted to separate the single panel into two panel sections. The two panel sections are adapted to move relative to each other about the living hinge. The frame surrounds the single panel. The frame comprises a flexing section provided adjacent the living hinge so that the two panel sections can move relative to each other. The tonneau cover is free of any mechanical hinges or mechanisms disposed between the panel sections for connecting the two panel sections.

A tonneau cover comprising a single panel. The single panel comprises a plurality of panel sections; and a plurality of living hinges defined between adjacent panel sections. The tonneau cover comprises a cover placed over the single panel so that a top and a bottom surface of the panel sections and the living hinges are covered by the cover, and a frame supporting the single panel. The panel sections are adapted to move relative to each other about the living hinges. The frame is provided around an entire perimeter of the single panel. The tonneau cover is free of any mechanical hinges or mechanisms disposed between the panel sections for enabling the panel sections to pivot or otherwise move relative to each other.

The tonneau cover may be free of any mechanical hinges or mechanisms disposed between the panel sections for enabling the panel sections move relative to each other. The tonneau cover may be adapted to be reconfigured between an extended configuration and a folded configuration or an extended configuration and a rolled configuration. In the extended configuration, the tonneau cover is generally planar and flat, and in the folded configuration the adjacent panel sections are folded relative to one another about the living hinges. In the rolled configuration, the adjacent panel sections are rolled relative to one another about the living hinges. The single panel may include a top side, and the tonneau cover comprises a cover that is placed over the single panel.

The tonneau cover may include a frame adapted to support the single panel, the frame is provided around an entire perimeter of the single panel. The frame comprises a flexing section located adjacent each of the living hinges so that the panel sections can move relative to each other about a corresponding one of the living hinges. The frame comprises rigid sections provided on each side of the flexing sections. The flexing sections comprise end caps that are adapted to fit into openings defined in adjacent rigid sections.

The single panel comprises a generally constant thickness extending along an entire length thereof, each of the living hinges is a thinned-out region defined in the generally constant thickness, the thinned-out region faces an inside of the cargo box. The thinned-out region is generally parabolic-shaped.

DETAILED DESCRIPTION

The teachings herein are directed to a tonneau cover. The tonneau cover may be a cover that is placed over a cargo box of a vehicle, such as a pick-up truck. The tonneau cover may also find use in an inside area of a vehicle, for example, to cover a floor area of a cargo space of a vehicle, such as a station wagon.

The tonneau cover may comprise a single, elongated enclosure panel. The enclosure panel may include one or more living hinges, that provides for the enclosure panel to bend, fold, roll, pivot, or otherwise move about the living hinge. While the teachings herein are directed to a single, elongated enclosure panel that includes one or more living hinges that is free of connectors or rails, it is understood that two or more enclosure panels, one or more of which may include one or more living hinges according to the teachings herein, may be joined together with a connector or railing.

The living hinge according to the teachings herein is a feature that allows for the enclosure panel to bend, fold, roll, pivot, flex, displace, or otherwise move about the living hinge. For example, the living hinge may be a cutout a detent, a notch, a groove, a channel, a thinned-area, a flexible material, or a combination thereof. As discussed further below, the living hinge may be formed by compression molding, notching cutting, or otherwise locally thinning a thickness of the material. The living hinge may have any suitable shape for the living hinge to function as disclosed herein. For example, the living hinge may have a circular shape, an oval shape, a parabolic shape, a triangular shape, a square shape, or a combination thereof.

Figure 1:
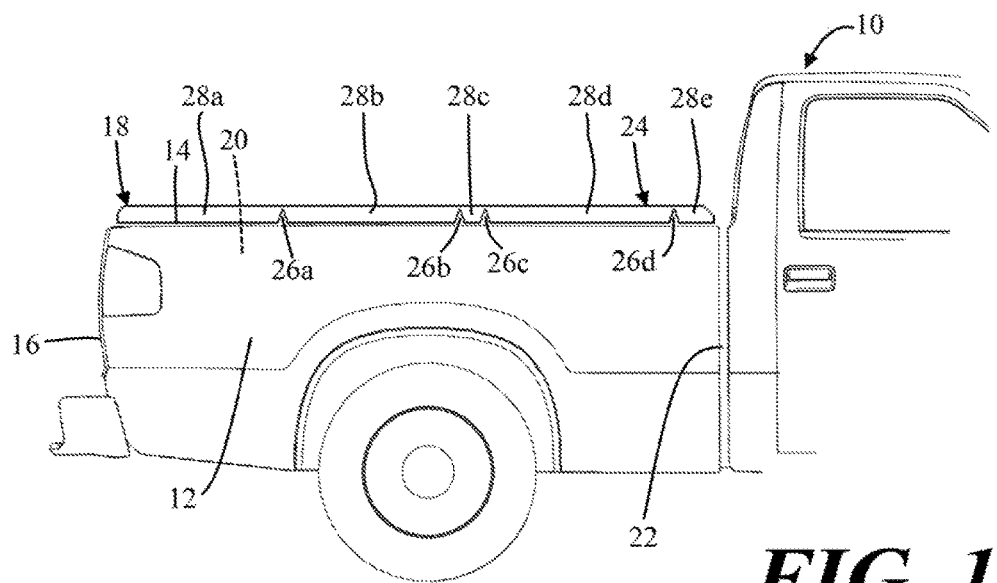
FIG. 1 is a side view of a vehicle and a tonneau cover, the tonneau cover is illustrated in an extended configuration

FIG. 1 illustrates a vehicle 10 comprising a cargo box 12. The cargo box 12 comprises a top end 14 and a back end 16. A tonneau cover 18 is adapted to be placed onto the top end 14 and cover the cargo box 12. The tonneau cover 18 may be adapted to protect against dirt, debris, and other contaminants from entering an inside 20 of the cargo box 12. The tonneau cover 18 illustrated in FIG. 1 is in an extended configuration, where the tonneau cover 18 is generally flat and planar, and not in a folded, rolled, or pivoted configuration. In the extended configuration, the tonneau cover 18 is expanded, and may be in contact with a top end 14 of the fenders that define the cargo box 12 and/or the top end of the back end 16 or tailgate.

With continued reference to FIG. 1, the tonneau cover 18 comprises a single, elongated enclosure panel 24 that extends generally along an entire length of the cargo box 12, from a front end 22 of the cargo box 12 to the back end 16. The enclosure panel 24 comprises a generally constant thickness along its entire length. It is understood, however, that the length of the enclosure panel 24 may be less than the entire length of the cargo box 12. For example, the enclosure panel 24 may have a length that is ¾ or more of the length of the cargo box 12; ½ or more of the length of the cargo box 12; ⅓ or more of the length of the cargo box 12; ¼ or more of the length of the cargo box 12, etc.

The tonneau cover 18 or enclosure panel 24 comprises a plurality of living hinges, identified at 26a, 26b, 26c, 26d. While the tonneau cover 18 or enclosure panel 24 illustrated in FIG. 1 comprises four living hinges 26a, 26b, 26c, 26d, the tonneau cover 18 or enclosure panel 24 may include any number of living hinges. For example, the tonneau cover 18 or enclosure panel 24 may include one or more living hinges, two or more living hinges, three or more living hinges, five or more living hinges, ten or more living hinges, etc. The living hinges 26 are described in further detail below at FIG. 5.

The tonneau cover 18 or enclosure panel 24 comprises a plurality of panel sections, identified at 28a, 28b, 28c, 28d, 28e. The panel sections 28a, 28b, 28c, 28d, 28e are defined by, between, or adjacent to, the living hinges 26a, 26b, 26c, 26d. The number of panel sections 28 corresponds to the number of living hinges 26. Therefore, the tonneau cover 18 or enclosure panel 24 may comprise two panel sections if there is only one living hinge; three panel sections if there are two living hinges; four panel sections if there are three living hinges; ten panel sections if there are eleven living hinges; etc.

Figure 2:
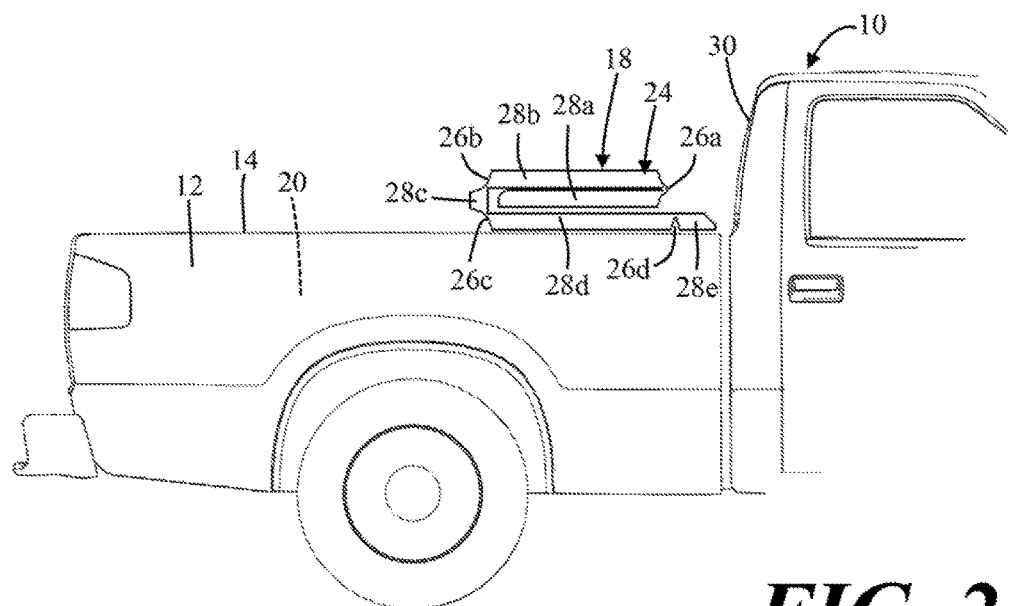
FIG. 2 is a side view of a vehicle and a tonneau cover, the tonneau cover is illustrated in a folded configuration.

FIG. 2 illustrates the tonneau cover 18 in a folded configuration. In a folded configuration, the tonneau cover 18 is not in an extended configuration. The living hinges 26a, 26b, 26c, 26d are adapted to provide for the panel sections 28a, 28b, 28c, 28d, 28e to move, pivot, or fold relative to each other and/or relative to the cargo box 12 into the folded configuration. In the folded configuration, at least a portion of the tonneau cover 18 is moved, displaced, pivoted, or otherwise displaced from the top end 14 of the cargo box 12.

For example, panel section 28a is foldable about living hinge 26a so that panel section 28 is in a planar arrangement with panel section 28b. Panel sections 28a and 28b are foldable about living hinge 26b. Panel sections 28a, 28b, and 28c are moveable or pivotable or foldable about living hinge 26c so that panel sections 28a, 28b, and 28d are in planar arrangement with each other.

While not illustrated in FIG. 2, panel sections 28a, 28b, 28c and 28d are moveable, pivotable, or foldable about living hinge 26d so that the panel sections 28a, 28b, and 28d are generally perpendicular to the folded configuration shown in FIG. 2. In the perpendicular configuration, the planar portions of the panel sections 28a, 28b and 28d would be folded adjacent to, or even in contact with, a rear panel or window 30 of the vehicle 10. Panel section 28e may be configured to remain secured to the top end 14 of the cargo box 12. Alternatively, while not shown, in other arrangements, the tonneau cover 18 may be adapted to be moved, folded, or pivoted from the front end 22 towards or all the way to the back end of the cargo box 12.

Moving the tonneau cover 18 into the folded configuration advantageously provides access to the inside 20 of the cargo box 12. Moving the tonneau cover 18 into the folded configuration also provides for storing or transporting items in the cargo box that extend beyond the top end 14 of the cargo box 12, for example.

Figure 3:
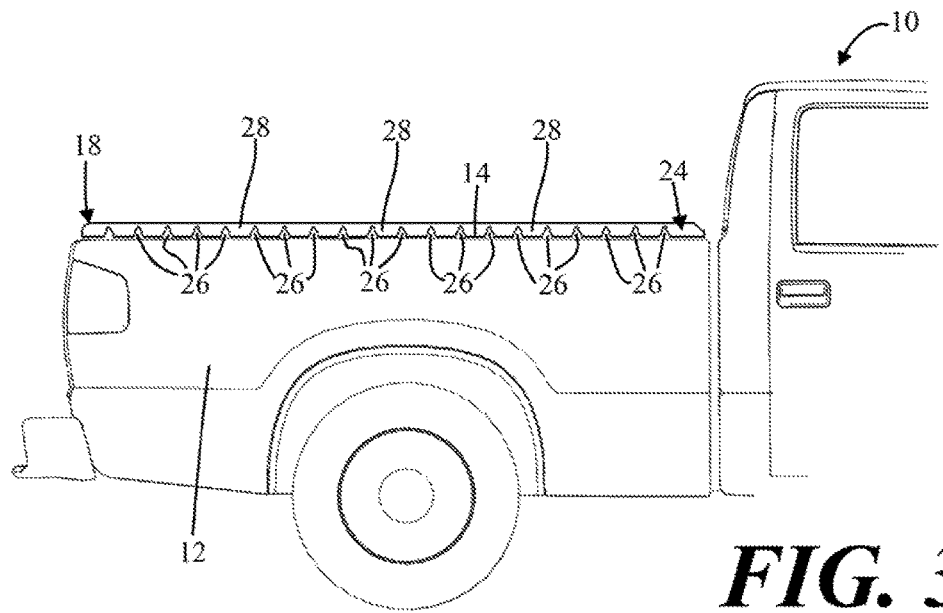
FIG. 3 is a side view of a vehicle and a tonneau cover, the tonneau cover is illustrated in an extended configuration.

FIG. 3 illustrates a vehicle 10 that is substantially similar to the vehicle 10 illustrated in FIG. 1. A tonneau cover 18 is adapted to be placed over the top end 14 of the cargo box 12 and cover the cargo box 12. The tonneau cover 18 illustrated in FIG. 3 is in an extended configuration, where the tonneau cover 18 is generally planar and flat, and not in a folded, rolled or pivoted configuration. In the extended configuration, the tonneau cover 18 is expanded, and may be in contact with a top end 14 of the fenders that define the cargo box 12 and/or the top end of the back end or tailgate.

The tonneau cover 18 comprises a single, elongated enclosure panel 24 that extends generally along an entire length of the cargo box 12. As was discussed above at FIG. 1, the length of the enclosure panel 24 may be less than the entire length of the cargo box 12. The panel 24 comprises a generally constant thickness along its entire length.

The tonneau cover 18 comprises a plurality of living hinges 26 along a length thereof. The tonneau cover 18 comprises a plurality of panel sections, identified at 28, that are defined by, between, or adjacent the living hinges 26. The tonneau cover 18 may include any number of living hinges 26 and corresponding panel sections 28.

Figure 4:
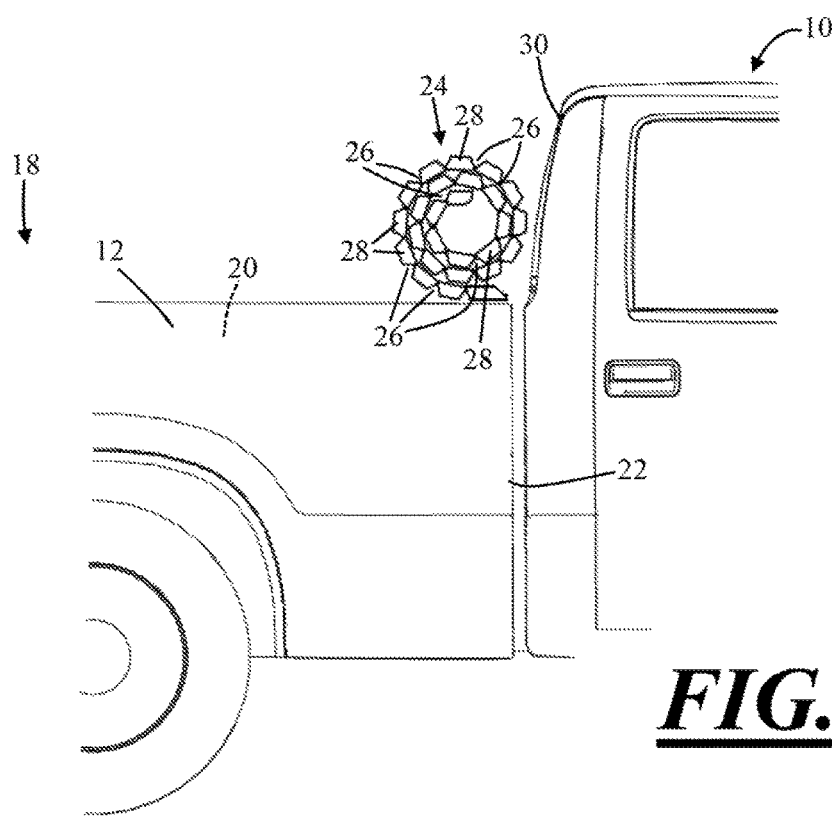
FIG. 4 is a side view of a vehicle and a tonneau cover, the tonneau cover is illustrated in a rolled configuration.

FIG. 4 illustrates the tonneau cover 18 of FIG. 3 in a rolled configuration. The living hinges 26 are adapted to provide for the panel sections 28 to be moved or pivoted or rolled relative to each other and/or relative to the cargo box 12 into the rolled configuration. The tonneau cover 18 may be rolled from the back end of the cargo box 12 all the way to the front end 22 of the cargo box 12 so that the tonneau cover 18 is adjacent the rear panel or window 30 of the vehicle. Alternatively, while not shown, the tonneau cover may be rolled towards the front end 22 of the cargo box 12, but not all the way to the rear panel or window 30. In other arrangements, the tonneau cover 18 may be adapted to be rolled from the front end 22 towards or all the way to the back end of the cargo box 12.

Moving the tonneau cover 18 into the rolled configuration provides access into the inside 20 of the cargo box. Moving the tonneau cover 18 into the rolled configuration provides for storing or transporting items in the cargo box that extend beyond the top end 14 of the cargo box 12.

Figure 5:
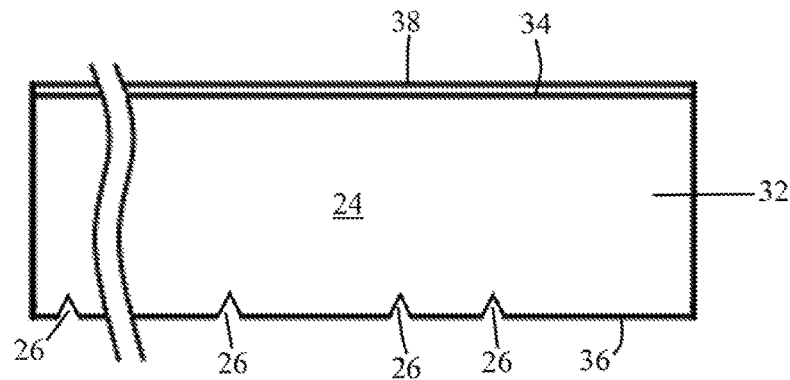
FIG. 5 is a partial cross section of an enclosure panel.

FIG. 5 illustrates a partial cross section of the enclosure panel 24. The enclosure panel 24 comprises a single, continuous, elongated member or panel. The enclosure panel 24 comprises a center core 32. The core 32 comprises a top side 34 and a bottom side 36. The bottom side 36 may be positioned to face the inside 20 of the cargo box 12 when the tonneau cover 18 is installed on the vehicle 10 and is in the expanded or unfolded or unrolled configuration (FIGS. 1 and 3).

The core 32 may be made from a suitable material that is preferably sturdy, yet light weight so that the tonneau cover 18 and/or panel 24 can be easily folded, pivoted, and/or rolled. For example, the core 32 may be made from a plastic material, such as an extruded polypropylene material.

The living hinges 26 may be formed in the bottom side 36 of the core 32. The living hinges 26 may be locally thinned-out regions or areas of reduced material thickness defined in the core 32. The living hinge 26 may have a parabolic or triangular shape that extends from the bottom side 36 towards the top side 34, but stops short of extending all the way to the top side 34. The living hinges 26 may be indents or depressions formed in the core 32 by a suitable method or technique, such as compression molding, notching, or a localized thinning process.

The top side 34 of the core 32 may be covered in a skin or cover layer 38. The skin or cover layer 38 may be made of a material that gives the tonneau cover 18 a smooth, sleek appearance. The skin or cover layer 38 may include various colors, textures, and/or designs. For example, the skin or cover layer 38 may be painted to match or accent an exterior color of the vehicle 10. The skin or cover layer 38 may be made from a variety of materials, including, but not limited to, TPU, TPV, TPE, and/or TPR. While FIG. 5 only illustrates the top side 34 of the core 32 being covered in the skin or cover layer 38, the bottom side 36 may also be covered in the skin or cover layer thereby concealing the living hinges 26 when the tonneau cover 18 is in a folded, pivoted, or rolled configuration.

The top side 34 and/or skin or cover layer 32 are preferably seamless. This means, that the top side 34 and/or the skin or cover 32 give the appearance of a sleek, smooth, uniform, and/or constant surface, tonneau cover 18. However, in some configurations, a seam added to the top side 34 and/or cover layer 32 may be desired, or required, to crease a visible mark or surface to assist a user in locating the area of where the living hinge is located and/or to assist in folding, moving, pivoting, rolling, or otherwise repositioning the panel sections of the tonneau cover 18. The seam may be a stitching, mark, or even a compression molded divot or notch added to the top side 34 and/or cover layer 32. Preferably, however, the seam or compression molded divot or notch is slight and less than a depth of the living hinge 26 defined on the opposing bottom side of the panel. The seam may also be used to hide sink marks in the top side 34 of the core 32 that may result from forming the living hinges 26. An exemplary seam is illustrated in FIG. 7 at 52.

Figure 6:
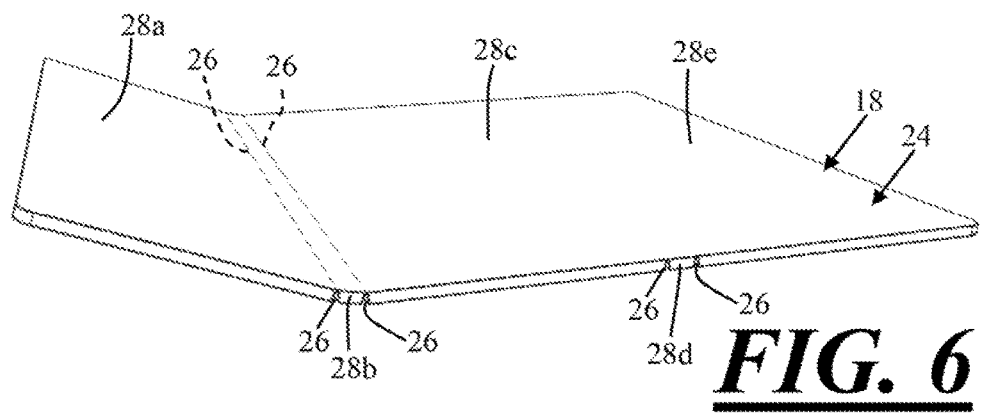
FIG. 6 is a perspective view of a tonneau cover in a pivoted, or partially folded configuration.

FIG. 6 illustrates a tonneau cover 18. The enclosure panel 24 comprises a plurality of living hinges 26 that define panel sections 28a, 28b, and 28c. The tonneau cover 18 of FIG. 6 is illustrated in a partially folded configuration, where panel section 28a is pivoted or tipped relative to the other panel sections 28b, 28c, 28d, 28e. Again, while the enclosure panel 24 comprises four hinges 26 and therefore five panel sections 28a, 28b, 28c, 28d, 28e, the tonneau cover 18 can comprise any number of hinges 26 and corresponding panel sections 28.

Figure 7:
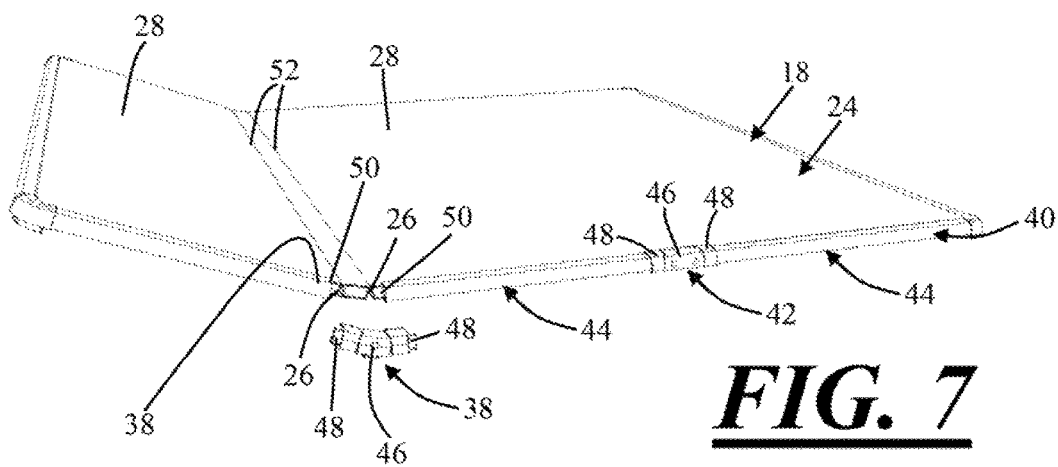
FIG. 7 is a perspective view of the tonneau cover with a frame assembly, the tonneau cover is in a pivoted, or partially folded configuration.

FIG. 7 illustrates a tonneau cover 18 that includes a frame 40. The frame 40 is adapted to surround a perimeter of the enclosure panel 24; provide structure or rigidity to the enclosure panel 24; provide a close out to conceal and protect edges of the enclosure panel 24, or a combination thereof.

The frame 40 comprises flexing sections 42 that are located or positioned adjacent the living hinges 26. The frame 40 comprises rigid sections 44 extending between the flexing sections 42. The rigid sections 44 may be made from a variety of materials, including, but not limited to, extruded aluminum, rigid plastic with or without glass reinforcement, polyester reinforced glass, injection molded plastics, etc.

The flexing sections 42 comprise a center portion 46 and opposing end caps 48 that are adapted to mate with, be received in, or engage openings 50 defined in the adjacent rigid sections 44. The center portions 46 may be formed of a flexible, bias able, resilient material that is adapted to bend, flex, pivot, or roll when the corresponding panels 28 of the tonneau cover 18 are moved, folded, pivoted, or otherwise repositioned. For example, the center portions 36 may be made of a rubber or other soft material such as a TPO, TPU, or TPV material. Additionally, or alternatively, the center portions 46 may comprise a hinge or other moving mechanism that is adapted to bend, flex, pivot, or roll when the corresponding panels 28 of the tonneau cover 18 are repositioned. The end caps 48 may be made from a variety of materials, including, but not limited to, extruded aluminum, rigid plastic with or without glass reinforcement, polyester reinforced glass, injection molded plastics, etc.

While not illustrated in FIG. 7, the frame 40 may comprise one or more reinforcing structures that extend between the rigid sections 44 in a cross-car direction. The one or more reinforcing structure may be positioned along the bottom side 36 of the core 32 or panel 24, and may be adapted to support load requirements and reinforce latching/attachment areas of the tonneau cover 18. The one or more reinforcing sections may be located between the living hinges. The one or more reinforcing sections may be attached to the rigid sections 44 of the frame 40. The one or more reinforcing sections may be made of a rigid material, such as a plastic like polypropylene or nylon, or even extruded aluminum.

The tonneau cover 18 illustrated in the FIGS. 1-7 and described herein is advantageously free of any mechanical hinges, connectors, rails, or other connecting mechanisms between the panel sections 28 for enabling the panel sections 28 to be moved, folded, or pivoted relative to each other. Instead, the enclosure panel 24 is a single, elongated panel, sheet, or member that extends generally along an entire length of the cargo box 12. Accordingly, by not having such mechanical hinges, connectors, rails, or other connecting mechanisms between the panel sections 28 passageways or gaps between the edges of the panel(s) and the connector(s) are eliminated thus eliminating opportunities for water to travel around the panels and/or connector and enter the inside 20 of the cargo box 12.

Moreover, by having a single, elongated enclosure panel 24 with panel sections 28 defined between the living hinges 26 as opposed to discrete rails or connectors, hinges, etc. connecting the individual panel sections, manufacturing and assembling the tonneau cover 18 may be less complex and less expensive; and storage space required at the manufacturing and/or assembly facility for storing the individual discrete connectors or rails, adhesive, and/or sealant can be eliminated.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

By use of the term "may" herein, it is intended that any described attributes that "may" be included are optional.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

LISTING OF REFERENCE NUMERALS

10 vehicle
12 cargo box
14 top end
16 back end
18 tonneau cover
20 inside of cargo box 12
22 front end
24 enclosure panel
26 living hinge
28 panel sections
30 rear panel or window of vehicle 10
32 center core of enclosure panel 24
34 top side of core 32
36 bottom side of core
38 skin or cover on top side 34 of core 32
40 frame
42 flexing sections
44 rigid sections
46 center portion
48 end caps
50 openings
52 seam

The invention claimed is:

1. A tonneau cover comprising:
   a single panel comprising a plurality of panel sections;
   at least one living hinge defined in the single panel, the panel sections are defined adjacent the at least one living hinge and are adapted to move relative to each other about the at least one living hinge; and
   wherein the tonneau cover is adapted to be placed over a top end of a cargo box of a pickup truck.

2. The tonneau cover according to claim 1, wherein the tonneau cover is free of any mechanical hinges or mechanisms disposed between the panel sections for enabling the panel sections move relative to each other.

3. The tonneau cover according to claim 2, wherein the tonneau cover is adapted to be reconfigured between an extended configuration and a folded configuration; and
   wherein in the extended configuration, the tonneau cover is generally planar and flat, and in the folded configuration the panel sections are folded relative to one another about the at least one living hinge.

4. The tonneau cover according to claim 2, wherein the tonneau cover is adapted to be reconfigured between an extended configuration and a rolled configuration; and
   wherein in the extended configuration the tonneau cover is generally planar and flat, and in the rolled configuration the panel sections are rolled relative to one another about the at least one living hinge.

5. The tonneau cover according to claim 1, wherein the tonneau cover comprises a frame adapted to support the single panel, the frame is provided around an entire perimeter of the single panel; and
   wherein the frame comprises a flexing section located adjacent the at least one living hinge so that the panel sections can move relative to each other about the at least one living hinge.

6. The tonneau cover according to claim 5, wherein the frame comprises rigid sections provided on each side of the flexing section.

7. The tonneau cover according to claim 6, wherein the flexing section comprises end caps that are adapted to fit into openings defined in the rigid sections.

8. The tonneau cover according to claim 1, wherein the single panel comprises a generally constant thickness extending along an entire length thereof, the at least one living hinges is a thinned-out region defined in the generally constant thickness, the thinned-out region faces an inside of the cargo box.

9. The tonneau cover according to claim 8, wherein the thinned-out region is generally parabolic-shaped.

10. The tonneau cover according to claim 1, wherein the single panel comprises a top side, and the tonneau cover comprises a cover that is placed over the single panel.

11. A tonneau cover comprising:
   a single panel;
   a living hinge separating the single panel into two panel sections, the two panel sections are adapted to move relative to each other about the living hinge; and
   a frame surrounding the single panel, the frame comprises a flexing section adjacent the living hinge so that the two panel sections can pivot relative to each other;
   wherein the tonneau cover is free of any mechanical hinges or mechanisms disposed between the panel sections for enabling the two panel sections to move relative to each other.

12. The tonneau cover according to claim 11, wherein the frame comprises rigid sections located on both sides of the flexing section.

13. The tonneau cover according to claim 12, wherein the single panel comprises a generally constant thickness extending along an entire length of the single panel, the living hinge is a thinned-out region defined in the generally constant thickness, the thinned-out region is adapted to face an inside of a cargo box.

14. The tonneau cover according to claim 13, wherein the thinned-out region is generally parabolic-shaped.

15. The tonneau cover according to claim 12, wherein the tonneau cover is adapted to be reconfigured between an extended configuration and a folded configuration; and
   wherein in the extended configuration the tonneau cover is generally flat, and in the folded configuration the panel sections are folded relative to one another about the living hinge.

16. The tonneau cover according to claim 12, wherein the tonneau cover is adapted to be reconfigured between an extended configuration and a rolled configuration; and
   wherein in the extended configuration the tonneau cover is generally flat, and in the rolled configuration the panel sections are rolled relative to one another about the living hinge.

17. A tonneau cover comprising:
   a single panel comprising a plurality of panel sections;
   a plurality of living hinges, each of the living hinges are defined between adjacent panel sections, the panel sections are adapted to move relative to each other about the living hinges;
   a cover placed over the single panel so that a top and a bottom surface of the panel sections and the living hinges are covered by the cover, and
   a frame supporting the single panel, the frame is provided around an entire perimeter of the single panel; and
   wherein the tonneau cover is free of any mechanical hinges or mechanisms disposed between the panel sections for enabling the panel sections to pivot or otherwise move relative to each other.

18. The tonneau cover according to claim 17, wherein the frame comprises a flexing section provided adjacent each of the living hinges, the flexing section comprises a flexible material that is adapted to move when the panel sections move relative to each other, the frame comprises rigid sections that are provided adjacent the flexing section, the flexing section comprises end caps that are adapted to engage openings in the rigid sections for connecting the flexing section and the rigid sections.

19. The tonneau cover according to claim 18, wherein the tonneau cover is adapted to be reconfigured between an extended configuration and a folded configuration; and
   wherein in the extended configuration the tonneau cover is generally flat, and in the folded configuration the panel sections are folded relative to one another about the living hinges.

20. The tonneau cover according to claim 18, wherein the tonneau cover is adapted to be reconfigured between an extended configuration and a rolled configuration; and
   wherein in the extended configuration the tonneau cover is generally flat, and in the rolled configuration the panel sections are rolled relative to one another about the living hinges.

\* \* \* \* \*